H. T. CLARK.
DISTRIBUTER.
APPLICATION FILED NOV. 1, 1913.

1,123,246.

Patented Jan. 5, 1915.
3 SHEETS—SHEET 1.

WITNESSES:
Frank H Carter
Clarence M. Smith

INVENTOR
Harrison T. Clark
BY
ATTORNEY

H. T. CLARK.
DISTRIBUTER.
APPLICATION FILED NOV. 1, 1913.
1,123,246.
Patented Jan. 5, 1915.
3 SHEETS—SHEET 2.
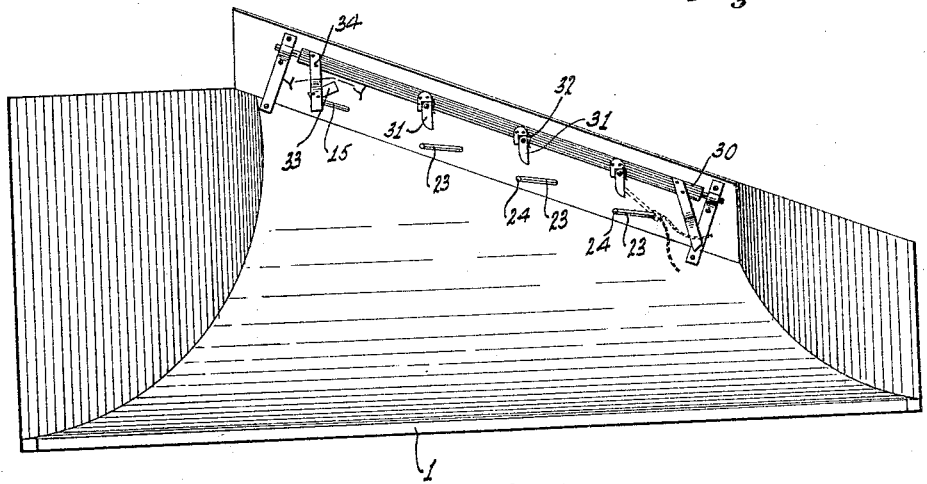
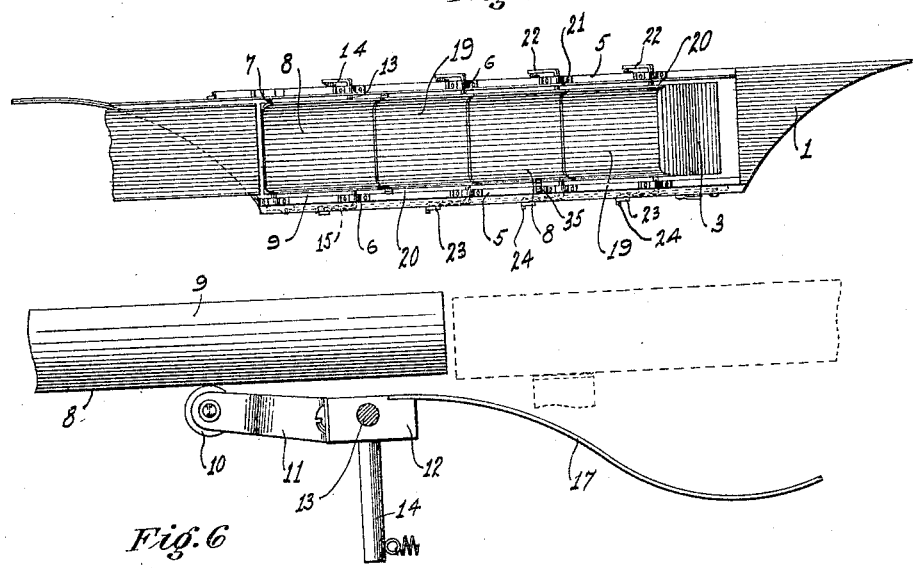
WITNESSES:
Frank H. Carter
Clarence M. Smith
INVENTOR
Harrison T. Clark
BY
Attorney H. T. CLARK.
DISTRIBUTER.
APPLICATION FILED NOV. 1, 1913.
1,123,246.
Patented Jan. 5, 1915.
3 SHEETS—SHEET 3.
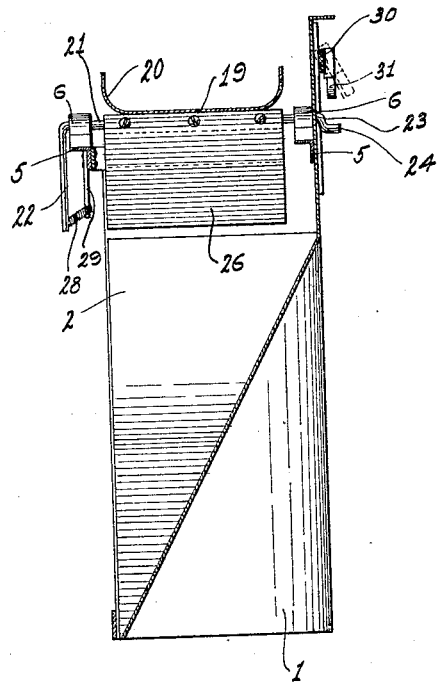
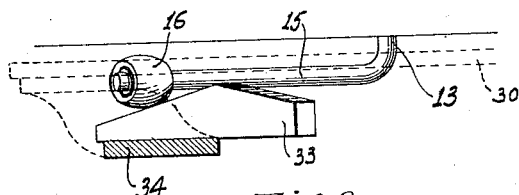
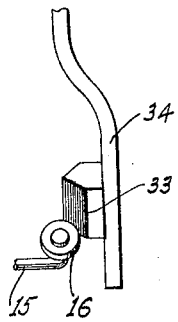
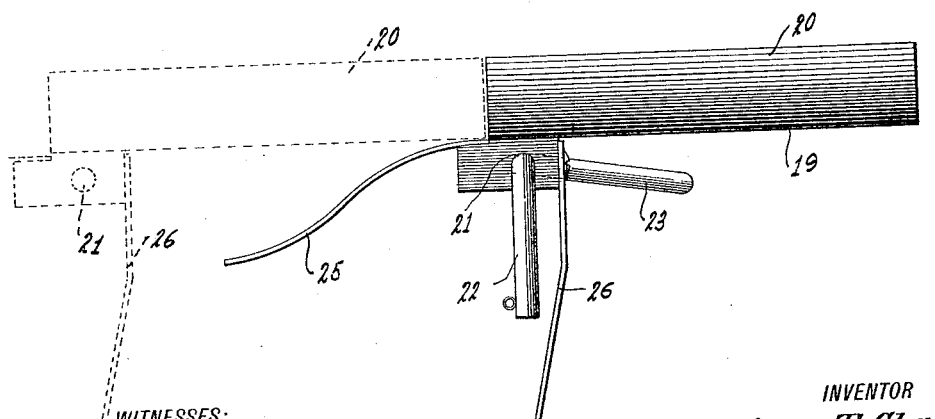
WITNESSES:
INVENTOR
Harrison T. Clark
BY
ATTORNEY

UNITED STATES PATENT OFFICE.

HARRISON T. CLARK, OF SAN FRANCISCO, CALIFORNIA.

DISTRIBUTER.

1,123,246.  Specification of Letters Patent.  Patented Jan. 5, 1915.

Application filed November 1, 1913. Serial No. 798,710.

*To all whom it may concern:*

Be it known that I, HARRISON T. CLARK, a citizen of the United States, residing in the city and county of San Francisco, State of California, have invented certain new and useful Improvements in Distributers; and I do declare the following to be a clear, full, and exact description of the same, such as will enable others skilled in the art to which it appertains to make and use the same, reference being had to the accompanying drawings, and to the characters of reference marked thereon, which form a part of this application.

This invention relates to improvements in distributing apparatus and the present invention is particularly designed as a distributer for use in connection with bread making machinery and is designed to be disposed between the rounder and the proofing machine whereby the dough balls will be received from the rounder and distributed therefrom upon the proofing machine in such spaced relation as is necessary for the proper handling of such dough balls. This distributing has always been done by hand until the structure disclosed in my Patent No. 1,090,777, dated March 17, 1914, was designed and this present invention embodies certain features of improvement over the structure shown in said patent whereby the handling of the dough balls can be done by the distributer in a more rapid, efficient and effective manner and with no chance of any failure of the mechanism to perform the function for which it is designed.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claims.

On the drawings, similar characters of reference indicate corresponding parts in the several views.

Figure 1:
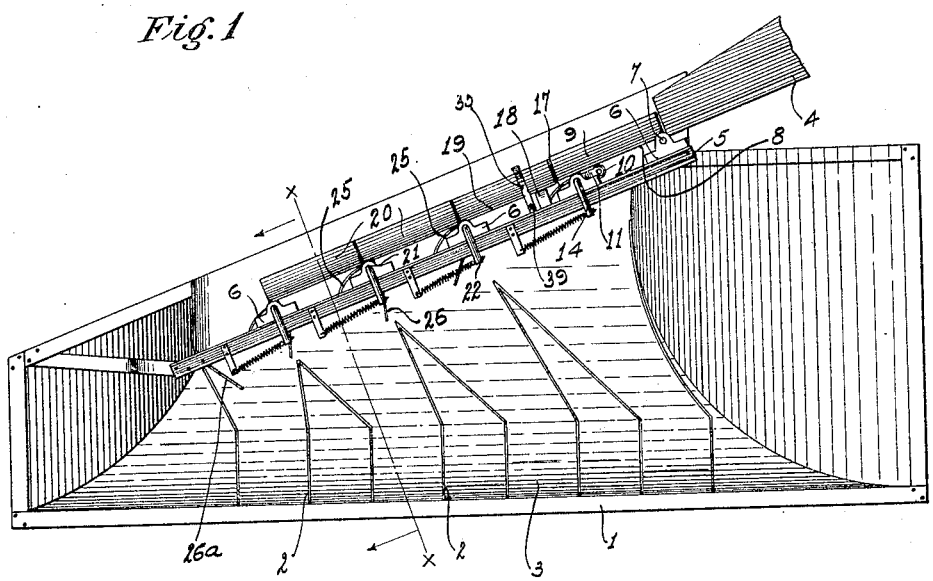
Figure 2:
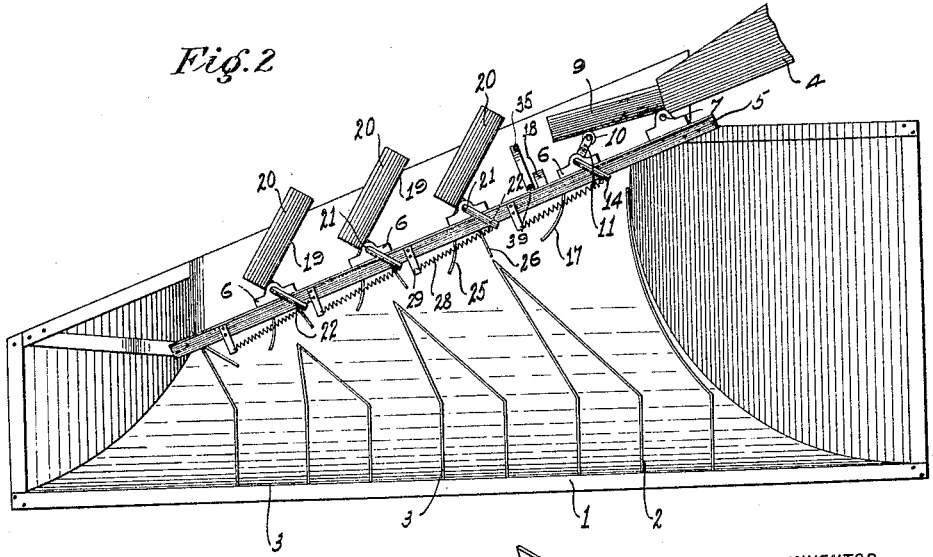
Figure 10:
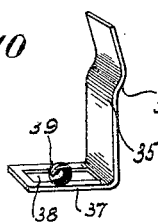

Figure 1 is a side elevation of the complete distributer showing the distributing paddles in normal receiving position. Fig. 2 is a similar view showing the paddles in normal tilted delivering position. Fig. 3 is a side elevation of the distributer showing the side opposite to that shown in Fig. 1. Fig. 4 is a top plan view of the distributer. Fig. 5 is a sectional view taken on a line X—X of Fig. 1. Fig. 6 is a fragmentary view showing the receiving end of the distributer. Fig. 7 is a sectional view taken on a line Y—Y of Fig. 3. Fig. 8 is an end view of the subject matter shown in Fig. 7. Fig. 9 is a side elevation of one of the complete distributer paddles shown detached from the supporting frame of the distributer. Fig. 10 is a perspective view showing a spring catch adapted to engage one of the distributing paddles to prevent the rebound thereof.

Referring now more particularly to the characters of reference on the drawings, the numeral 1 designates the main supporting plate of the device which is slightly sloping from its upper to its lower edge and provided with a plurality of divisional vanes which divide it into a plurality of spaced channels or runways 3.

The numeral 4 designates the chute or slide adapted to lead from the rounding machine and carry the dough balls therefrom to the distributer. The distributer proper is mounted on a supporting frame comprising a pair of spaced supporting bars 5 on which are disposed a plurality of pairs of journal boxes 6. In the uppermost journal boxes 6 is journaled a pin 7 on which is secured the upper end of the paddle 8, such paddle being provided with projecting side members 9 in order to prevent the dough balls from getting off of the paddle 8 in passing thereover. Said paddle, 8 at a point near its lower end, rests upon a roller 10 secured in an arm 11 projecting from a block 12 secured on a pin 13 journaled in the next succeeding pair of journal boxes 6. One end of the pin 13 bends downwardly as at 14 and the other end bends backwardly as at 15 and is provided with a rolling cam 16 at its outer end for a purpose as will presently appear. On the front edge of the block 12 is provided a downwardly projecting and curved plate or blade 17.

Mounted on the members 5 directly in front of the last described journal boxes 6 is a cross bar 18 on which normally rests the rear free end of a paddle 19. Such paddle 19 is provided with sides 20 similar to the sides 9 on the paddle 8. The lower end of the paddle 19 is secured to a pin 21 journaled in the next pair of journal boxes 6. The pin 21 is provided at one end with a bent end 22 similar to the end 14 on the pin 13 and on its other end is provided with a backwardly extending bent portion 23 provided with a projecting pin 24. On the lower end of the paddle 19 is a downwardly projecting curved extension 25 similar to the extension 17 and secured to the said paddle 19 back of this extension 25 is a downwardly extending plate 26. Connected with the member 22 is a spring 28 engaging an arm 29 at its other end, which arm 29 is secured to one of the members 5.

Pivotally mounted on the next succeeding journal boxes 6 are paddles and their connections which are the exact duplicate of the paddle 19 and its construction and connections. When in normal position, these paddles 19 will rest at their free extremities in close proximity to their adjacent paddles and each paddle, by reason of the construction shown, forms a lock for its preceding paddle which prevents such preceding paddle from tilting until the first named paddle is tilted. This function is caused by reason of the pivotal points of the paddles being off center on the end adjacent to the engaging point between each paddle and its next succeeding paddle whereby the paddle will not be overweighted to cause it to tilt until the next succeeding paddle has tilted to permit the material passing over the paddles to then pass onto the extensions 25. The dough ball passes from the chute 4 onto the paddles 8 and 19 travels down said paddles to the lowest one and then passes off of such lowest paddle to the extension 25 thereof which then overweights that end of the paddle and causes it to tilt on its pivotal point 21. This tilting position then leaves an open space between the last paddle and the next paddle whereby the next dough ball can pass onto and over the next paddle and onto the extension 25 thereof and so on for each of the paddles 19. When this operation takes place, said paddles are held in such tilted position by means of the following structure, namely:

On the side of the member 1 through which project the bent ends 15 and 23, I provide a rocking bar 30 capable of swinging laterally with respect to the length of the said member 1 and on this bar 30 I provide a plurality of spring pressed dogs 31, one for each of the members 23. Then when said paddles 19 tilt, they throw the bent portions 23 on the pins 21 upwardly causing the pins 24 to engage curved surfaces on the members 31 and move said members 31 against their springs 32 permitting the said pins 24 to pass beyond said dogs 31 when the springs 32 return said dogs to normal position and the pins 34 then rest against the square sides of such members 31 which holds the paddles 19 in tilted position in order to permit of the operation described.

The purpose of each of the plates 26 is to form a dashboard for each paddle so that when such paddle tilts, the exact movement of the dough balls will be determined by this dashboard 26. This therefore will also determine the exact amount of downward movement of each of the extensions 25 for the purpose of completing the tilting operation of each of the paddles to its fullest extent to cause the pin 24 to engage the dog 31 so that the paddle cannot drop back until it is proper for it to do so. In this regard it is pointed out that when the dough ball slides off of the paddle 19 onto the extension 25 it will strike the plate 26 which will only allow it a fixed and determined space in which to move, which space is predetermined in order that the dough ball will stay on the extension 25 long enough to completely tilt the paddle 19. The dough ball then passes into one of the channels 23 and thence to the proofing machine. Inasmuch as the lower paddle has no succeeding paddle to be provided with the plate 26, I provide a fixed plate $26^a$ secured to the members 5 and in the same position as would be assumed by one of the plates 26 were there another paddle in that place.

When all the paddles 19 have tilted and the last dough ball passes off of the paddle 8 and strikes the extension 17, it causes such extension 17 to tilt upon its pivotal connection of the pin 13 in the journal boxes 6 and throws the bent portion 15 upwardly causing the member 16 to engage a beveled block 33 on an arm 34 secured to the rocking bar 30 and this operation moves said rocking bar 30 outwardly away from the side of the member 1 and incidentally moves the pins 24 out of engagement with the dogs 31 and the weight of the paddles assisted by the contractile action of the springs 28 returns all the paddles to normal position.

With the movement of the paddle 17 the arm 11 is thrown upwardly causing the roller 10 to bear against the paddle 8 and tilt it slightly upward at its lower end for an instant while the other paddles 19 are dropping. This holds the next dough ball, which is moving rapidly, for a moment in suspension and then shoots it up over the lower end of the paddle 8 clear into the first paddle 19 thus preventing its being pinched between the paddles 8 and 19 which might occur if this structure were not used and thus render the device inoperative. Then when all this last described operation has taken place and all the paddles have dropped back to normal position including the extension 17 and its connected parts, this releases the bar 30 from its outward position and it drops back to normal position and the entire device is then ready for further operation.

In order to prevent any rebound of the paddles when they drop into normal untilted position, I provide a spring catch 35 provided with a notch 36 adapted to engage the edge of the first paddle 19 which would hold said paddle from rebounding which might cause it to pinch the dough ball irrespective of the movement of the paddle 8 since the success of the lifting operation of the paddle 8 depends of course upon the first paddle 19 being held stationary. This spring catch is of such tension as to prevent the rebound of the paddle but can be readily overcome when the paddle is tilted by the weight of the dough ball. The said catch 35 is secured to one of the members 5 by a base plate 37 which is provided with a seat 38 whereby the same can be slidably disposed over an adjustment screw 39 whereby the position of the catch 35 may be accurately adjusted for perfect operation.

Reviewing now briefly the complete operation of the device, the first dough ball travels over all of the paddles and strikes the lowest extension 25 tilting the paddle, this complete tilting operation being determined by the plate 26ª. The pin 24 on this lowest paddle then engages its corresponding dog 31. Then the next paddle is tilted by the next dough ball, the same striking the plate 26 on the paddle which has just tilted, thus giving such second paddle a complete tilting movement throwing the pin 34 therein into engagement with its corresponding dog 21. Similarly will all the paddles 19 tilt and be locked in tilted position. Then the extension 17 tilts, releasing all the paddles 19, and throwing the paddle 8 up just as the paddles 19 drop, the lowest paddle 19 being caught by the catch 35. Then the paddle 8 drops to normal position throwing the extension 17 to normal position and releasing the roller 16 from the block 33 allowing the bar 30 to drop to normal position when the above operation is repeated. All of this takes place very rapidly and allows the dough balls to be received and distributed just as fast as they come from the rounder, such distribution being made on the proofing machine in as spaced relation as is necessary.

While I have herein described in detail the various forms of specific structure, such as the springs 28 for returning the paddles to normal position, and the specific means of locking one paddle against being tilted until its succeeding paddle has tilted, still I do not mean in this application to confine myself to any of these specific details since they are covered broadly in the above mentioned application for patent and they are merely here repeated in order to completely describe that portion of the device.

The main essential improvements in this structure over that shown in the above entitled application are the specific structure of the extensions 25 and their correlation with the plates 26, the specific construction and operation of the paddle 8 and the improved method of holding the paddles in and releasing them from tilted position.

From the foregoing description it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention.

Having thus described my invention what I claim as new and useful and desire to secure by Letters Patent is:—

1. A device of the character described comprising a plurality of paddles pivotally mounted, the first of said paddles being pivoted at its upper end and the balance of said paddles being pivoted at their lower ends, means for tilting all of said paddles, means for holding them in tilted position and means for returning them to normal untilted position, as described.

2. A device of the character described comprising a paddle pivoted at one end, a member pivotally mounted near the other end of said paddle, a downwardly projecting extension on said member, an arm on said member having a member engaging the free end of said paddle, and a plurality of other paddles pivotally mounted in successive order and one of them being adapted to communicate with said first named paddle, as described.

3. A device of the character described comprising a plurality of paddles arranged in successive order and pivotally mounted, each paddle having a downwardly projecting extension at one end, each paddle having a projecting plate on its under side adapted to project at a point adjacent the downwardly projecting extension on the adjacent paddle when said paddles are tilted, as described.

4. A device of the character described comprising a single paddle pivoted at one end, a plurality of paddles alined with said first named paddle and pivoted at ends opposite the end to which said first named paddle is pivoted, means for tilting said last named paddles, and means for tilting said first named paddle when said second named paddles are returning to normal position, as described.

5. A device of the character described comprising a plurality of paddles pivotally mounted, a projecting pin carried by each paddle, a swinging bar adapted to swing laterally with respect to said paddles, a plurality of spring pressed dogs on said swinging bar, said pins adapted to engage said dogs when said paddles are tilted, and means for moving said swinging bar to release said pins from said dogs when all of said paddles are tilted, as described.

6. A device of the character described comprising the combination of a paddle pivoted at one end, a member pivotally mounted near the other end of said paddle and having a member adapted to engage the underside of said paddle in rolling contact, a plurality of paddles pivotally mounted and communicating with said first named paddle, means for tilting said plurality of paddles, and means for moving said member on its pivotal point when all of said plurality of paddles have been tilted and are returning to normal position, as described.

7. A device of the character described comprising the combination of a plurality of paddles journaled at points intermediate their ends and overlapping one another, a means delivering to said paddles, means for tilting said paddles, means for returning said paddles to normal non-tilted position and means engaging the first of said paddles to prevent the same from rebounding when it returns to normal non-tilted position, as described.

8. A device of the character described comprising the combination of a plurality of paddles pivoted at points intermediate their ends and overlapping one another, means for tilting said paddles, means for returning them to normal non-tilted position and a spring catch adapted to engage one of said paddles when it returns to normal non-tilted position, as described.

In testimony whereof I affix my signature in presence of two witnesses.

HARRISON T. CLARK.

Witnesses:
ROBT. R. HUSBAND,
FRANCES M. CLARK.

Copies of this patent may be obtained for five cents each, by addressing the "Commissioner of Patents, Washington, D. C."